(12) United States Patent
Yaosaka

(10) Patent No.: US 10,257,252 B2
(45) Date of Patent: Apr. 9, 2019

(54) TRANSMISSION APPARATUS, COMMUNICATION METHOD, AND STORAGE MEDIUM

(71) Applicant: CANON KABUSHIKI KAISHA, Tokyo (JP)

(72) Inventor: Akira Yaosaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 327 days.

(21) Appl. No.: 14/993,581

(22) Filed: Jan. 12, 2016

(65) Prior Publication Data

US 2016/0212193 A1 Jul. 21, 2016

(30) Foreign Application Priority Data

Jan. 15, 2015 (JP) .................................. 2015-005927

(51) Int. Cl.
H04L 29/08 (2006.01)

(52) U.S. Cl.
CPC .......... H04L 67/02 (2013.01); H04L 67/2833 (2013.01); H04L 67/32 (2013.01)

(58) Field of Classification Search
CPC ...... H04L 67/02; H04L 67/2833; H04L 67/32
See application file for complete search history.

(56) References Cited

U.S. PATENT DOCUMENTS

| 7,565,423 B1* | 7/2009 | Fredricksen | H04L 29/12066 |
| | | | 709/203 |
| 2008/0209071 A1* | 8/2008 | Kubota | H04L 29/06 |
| | | | 709/238 |
| 2009/0154694 A1* | 6/2009 | Yamauchi | G11B 20/00086 |
| | | | 380/44 |
| 2011/0072113 A1* | 3/2011 | Goto | H04L 65/1026 |
| | | | 709/218 |
| 2013/0238751 A1* | 9/2013 | Raleigh | H04L 67/20 |
| | | | 709/217 |
| 2013/0238761 A1* | 9/2013 | Raleigh | H04L 67/306 |
| | | | 709/219 |
| 2013/0335582 A1* | 12/2013 | Itasaki | G06F 3/005 |
| | | | 348/207.1 |
| 2015/0161284 A1* | 6/2015 | Mineki | H04N 21/4126 |
| | | | 709/213 |

FOREIGN PATENT DOCUMENTS

| JP | 2012-253583 A | 12/2012 |
| JP | 2013-005239 A | 1/2013 |
| JP | 2014010622 A | 1/2014 |

OTHER PUBLICATIONS

Ilya Grigorik; "High Performance Browser Networking;" May 15, 2014; pp. 211-212, and pp. 219-220.

* cited by examiner

Primary Examiner — Aftab N. Khan
(74) Attorney, Agent, or Firm — Canon U.S.A., Inc. IP Division

(57) ABSTRACT

A transmission apparatus includes a storage unit configured to store a content, a notification unit configured, in a case where contents identified by a list of contents that is to be transmitted to a reception apparatus include unstored contents that are not stored in the storage unit, to issue a notification to the reception apparatus so that a content request for at least one of the unstored contents is not transmitted, a control unit configured to store the unstored content corresponding to the notification, into the storage unit, and a transmission unit configured to transmit the stored content to the reception apparatus.

22 Claims, 12 Drawing Sheets

TRANSMISSION APPARATUS, COMMUNICATION METHOD, AND STORAGE MEDIUM

BACKGROUND OF THE INVENTION

Field of the Invention

The present invention relates to a transmission apparatus that transmits a content.

Description of the Related Art

In recent years, there are communication apparatuses such as a mobile phone and a digital camera having a function of accessing a server apparatus on the Internet that provides a content sharing service or a communication service. For example, a user can upload a captured image content to a photo-sharing service, or transmit a message to friends by using the communication apparatuses. Generally, a HyperText Transfer Protocol (HTTP) is used in transmission and reception of the content between a web server apparatus and a client apparatus.

The Internet Engineering Task Force (IETF) is formulating a standard of an HTTP/2 as one type of the HTTP protocol. In the HTTP/2, connection can be established between a server apparatus and a client apparatus, and a plurality of logical sessions called streams can be built within the connection. A message can be independently transmitted and received between the server apparatus and the client apparatus for each of the streams. In the HTTP/2, a frame called PushPromise is defined. The PushPromise reserves a stream for performing transmission and reception into the client apparatus from the server apparatus. By using the PushPromise, information can be transmitted to the client apparatus at any timing of the server apparatus side.

Japanese Patent Application Laid-Open No. 2014-10622 discusses content distribution using Push distribution for distributing a content from a server apparatus without receiving a request from a client apparatus. More specifically, the client apparatus transmits a request message of a hypertext markup language (html) file to the server apparatus. The server apparatus previously collects, from another server apparatus, content data related to the html file requested from the client apparatus. The collected content data is distributed from the server apparatus using the Push distribution. This realizes high-speed distribution of a web page (see Japanese Patent Application Laid-Open No. 2014-10622).

However, when the server apparatus transmits a content to the client apparatus, the efficiency of content transmission may be degraded in a conventional technique.

For example, the client apparatus attempts to acquire a content list and acquire each of contents included in the content list. When acquiring each content, the client apparatus transmits an acquisition request of each of the contents to the server apparatus. If, however, the server apparatus cannot immediately transmit the contents, the client apparatus may retransmit the acquisition request. In this case, the client apparatus issues a useless acquisition request to wait for a response thereto, and the server apparatus receives the useless acquisition request to confirm that the response is impossible. The processing related to the retransmission of the acquisition request degrades the efficiency of the transmission of the contents.

SUMMARY OF THE INVENTION

According to an aspect of the present invention, an apparatus includes a storage unit configured to store a content, a notification unit configured, in a case where contents identified by a list of contents that is to be transmitted to a reception apparatus include unstored contents that are not stored in the storage unit, to issue a notification to the reception apparatus so that a content request for at least one of the unstored contents is not transmitted, a control unit configured to store the unstored content corresponding to the notification into the storage unit, and a transmission unit configured to transmit the stored content to the reception apparatus.

Further features of the present invention will become apparent from the following description of exemplary embodiments with reference to the attached drawings.

DESCRIPTION OF THE EMBODIMENTS

Figure 1:
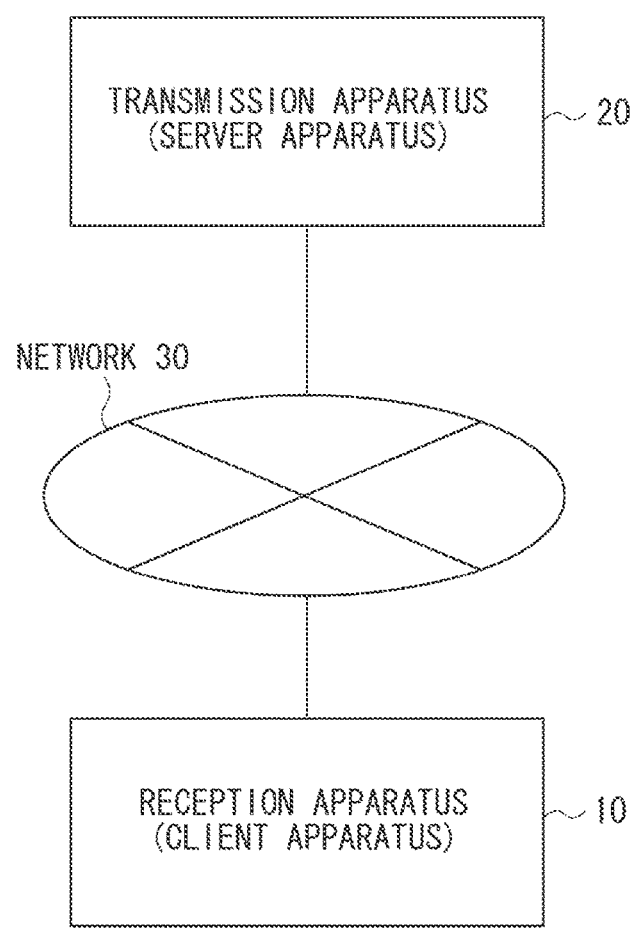
FIG. 1 illustrates an example of a configuration of a content transmission system according to an exemplary embodiment.

An exemplary embodiment of the present invention will be described below.

<Entire System Configuration>

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof.

A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

FIG. 1 illustrates an example of a configuration of a communication system that performs content transmission according to the present exemplary embodiment.

A reception apparatus 10 according to the present exemplary embodiment has a communication function for receiving a content and a content list, a display function, and an operation function. A specific example of the reception apparatus 10 includes a personal computer, a television set, and a smartphone.

The content list enumerates some or all of contents that can be transmitted from a transmission apparatus 20. For example, the content list includes a list of contents such as a still image and a moving image stored in a camera serving as the transmission apparatus 20.

The transmission apparatus 20 according to the present exemplary embodiment has a communication function for transmitting a content and a content list, a content conversion function, a display function, and an operation function. A specific example of the transmission apparatus 20 includes a camera, a personal computer, and a hard disk recorder.

The content conversion means acquisition processing for acquiring a content in a form conforming to the reception apparatus 10, by converting a size and/or a format of a content held by the transmission apparatus 20. For example, if the transmission apparatus 20 has a still image of a large size, and the reception apparatus 10 can display only a still image of a small size, the transmission apparatus 20 reduces and converts the size of the still image when transmitting the still image to the reception apparatus 10. When a format of a moving image held by the transmission apparatus 20 differs from a format of a moving image that can be reproduced by the reception apparatus 10, the transmission apparatus 20 converts the format. Although the content conversion is performed as acquisition processing in the present exemplary embodiment, processing performed in the acquisition processing is not limited to the content conversion. For example, the transmission apparatus 20 can also acquire a content in a form conforming to the reception apparatus 10 from an external apparatus.

The reception apparatus 10 and the transmission apparatus 20 are connected to each other via a network 30. A specific example of the network 30 includes a wired local area network (LAN), a wireless LAN, a wide area network (WAN), and the Internet.

<Hardware Configuration of Transmission Apparatus>

Figure 2:
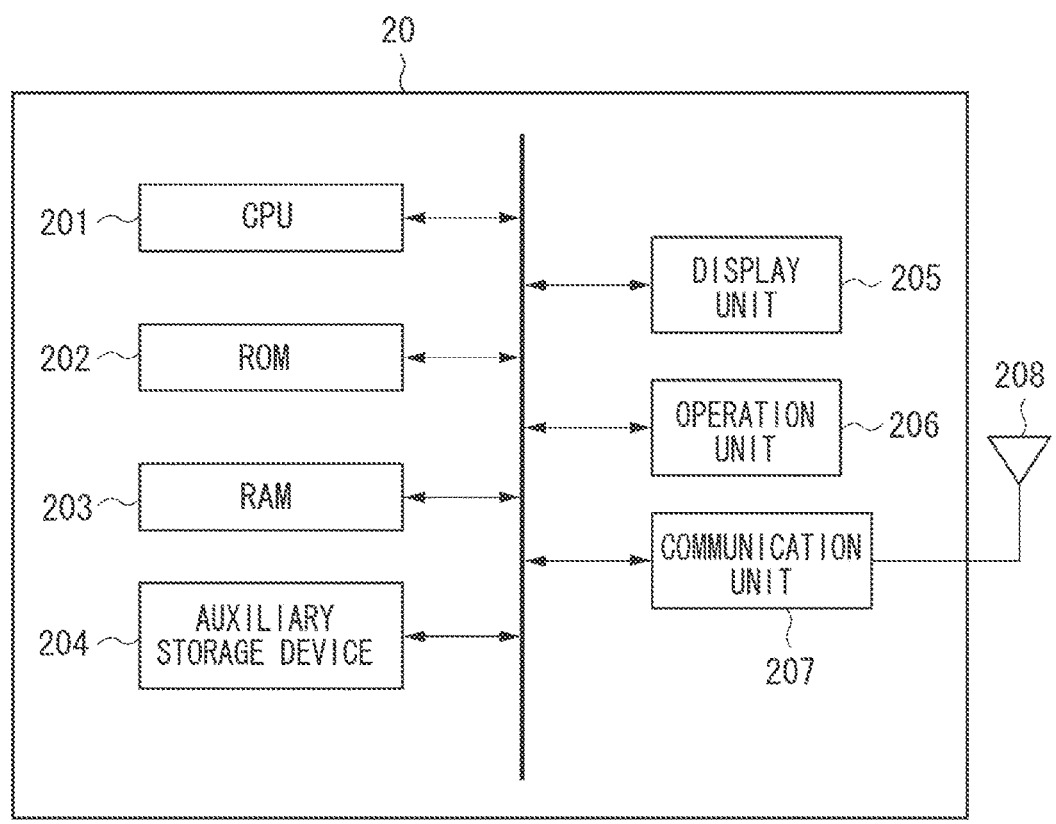
FIG. 2 is a block diagram illustrating an example of a hardware configuration of a transmission apparatus according to an exemplary embodiment.

FIG. 2 is a block diagram illustrating an example of a hardware configuration of the transmission apparatus according to the present exemplary embodiment. The transmission apparatus 20 includes a central processing unit (CPU) 201, a read-only memory (ROM) 202, a random access memory (RAM) 203, an auxiliary storage device 204, a display unit 205, an operation unit 206, a communication unit 207, and a wireless LAN antenna 208.

The CPU 201 controls the entire transmission apparatus 20. The ROM 202 stores a program or a parameter, which are used for implementing an operation of the transmission apparatus 20, and need not be changed. The RAM 203 temporarily stores a program or data supplied from the auxiliary storage device 204. The auxiliary storage device 204 stores setting data such as a wireless parameter and content data such as an image and a moving image. A specific example of the auxiliary storage device 204 includes a memory card and a hard disk. The display unit 205 displays a Graphical User Interface (GUI) for a user to operate the transmission apparatus 20. A specific example of the display unit 205 includes a liquid crystal display and a plasma display. The operation unit 206 is an input interface for the user to operate the transmission apparatus 20 using a mouse or a keyboard. The communication unit 207 is a connector or a communication circuit for communicating with the reception apparatus 10 via the network 30. The wireless antenna 208 is controlled by the communication unit 207 during communication via the wireless LAN.

A hardware configuration of the reception apparatus 10 is similar to that of the transmission apparatus 20.

While the display unit 205 is integrated with the transmission apparatus 20 in the above description, the display unit 205 may be provided separately from the transmission apparatus 20. In this case, the CPU 201 in the transmission apparatus 20 operates as a display control unit to control display on the external display unit 205. The same is true for the reception apparatus 10.

<Module Configuration of Transmission Apparatus>

Figure 3:
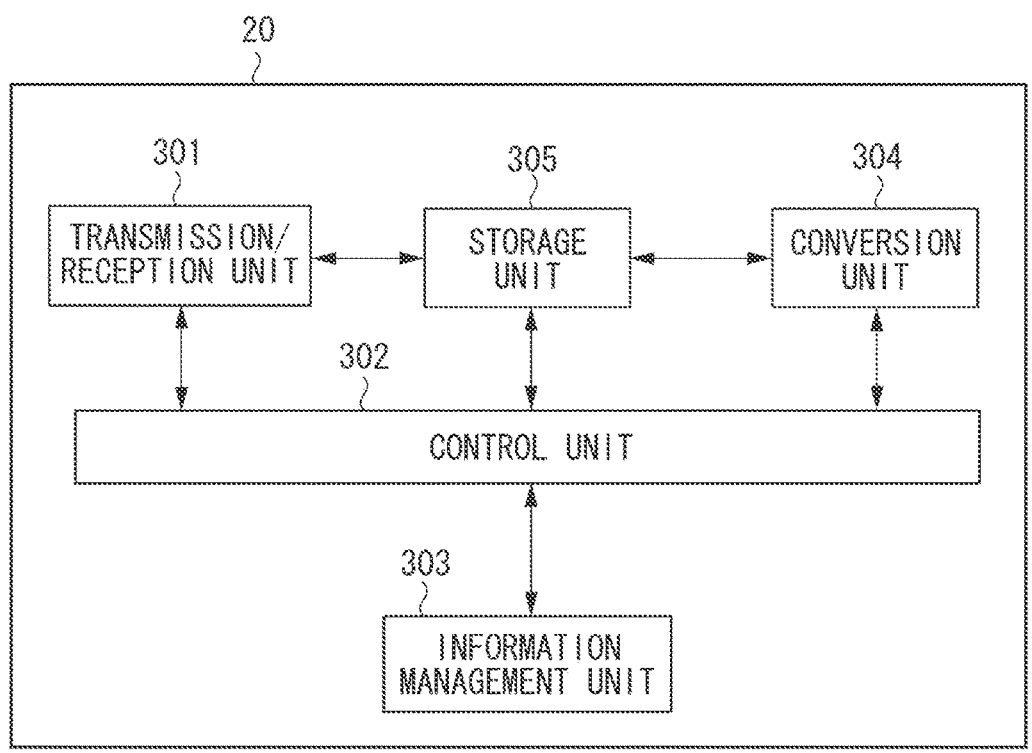
FIG. 3 is a block diagram illustrating an example of a functional module configuration of the transmission apparatus according to an exemplary embodiment.

FIG. 3 is a block diagram illustrating an example of a functional module configuration of the transmission apparatus 20 according to the present exemplary embodiment. The transmission apparatus 20 includes a transmission/reception unit 301, a control unit 302, an information management unit 303, a conversion unit 304, and a storage unit 305.

The transmission/reception unit 301 performs message control to transmit and receive a request and a response to and from the reception apparatus 10. The transmission/reception unit 301 has a function of generating a request and a response using the HTTP/2, and transmitting and receiving the generated request and response. Alternatively, a protocol other than the HTTP/2 can also be used for exchange between the transmission apparatus 20 and the reception apparatus 10. When transmitting contents, the transmission/reception unit 301 accesses the contents stored in the storage unit 305 to transmit the contents. The control unit 302 controls the whole of each of the functional modules included in the transmission apparatus 20. The control unit 302 analyzes information about a content list and information about contents. The information management unit 303 manages the information about the content list and the information about the contents. The conversion unit 304 accesses the content stored in the storage unit 305, and performs content conversion according to a setting designated from the control unit 302. The storage unit 305 includes the RAM 203 and/or the auxiliary storage device 204. The storage unit 305 stores a content, and transfers the content to the transmission/reception unit 301 and the conversion unit 304.

<Data Configuration of Content List Information and Content Information>

Figure 10:
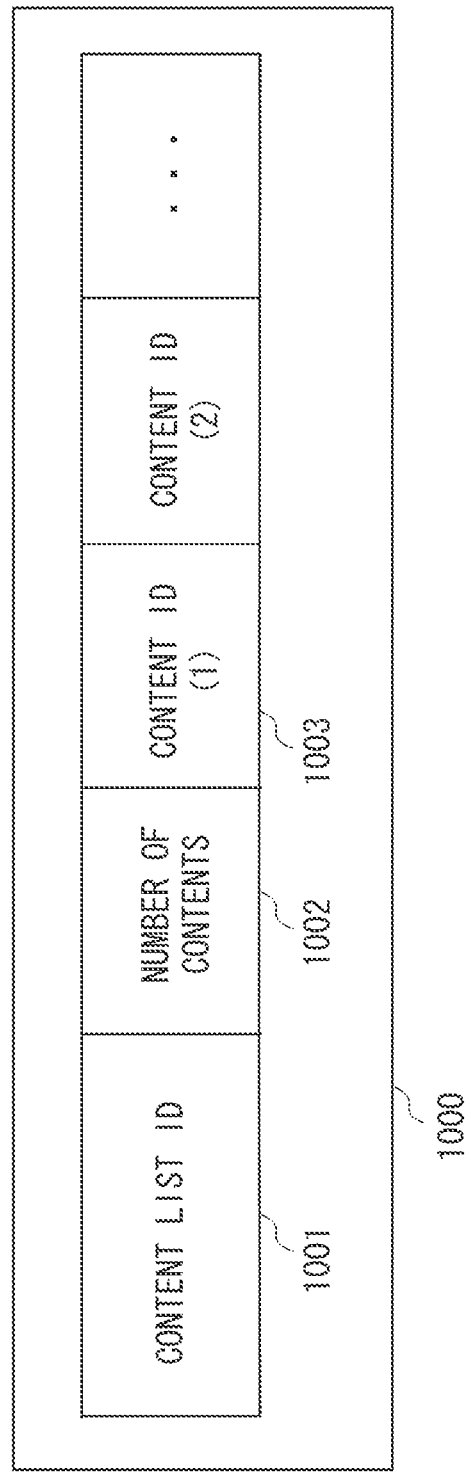
FIG. 10 illustrates an example of a data configuration of content list information according to an exemplary embodiment.

FIG. 10 illustrates an example of a data configuration of content list information 1000 according to the present exemplary embodiment.

In the present exemplary embodiment, when the transmission apparatus 20 receives one content list acquisition request from the reception apparatus 10, the transmission apparatus 20 generates one piece of content list information 1000. For example, when the transmission apparatus 20 is requested by the reception apparatus 10 to transmit a still image captured at a specific date and time, the transmission apparatus 20 extracts, from among contents stored in the storage unit 305, the contents corresponding to the condition, and lists the extracted contents, to generate content list information 1000. However, the present invention is not limited to this example. A plurality of pieces of content list information 1000 may be generated in response to one content list acquisition request.

A content list identification data (ID) 1001 is identification information of a content list. The number of contents 1002 is a value representing the number of contents included in the content list. A content ID 1003 is identification information of each of the contents included in the content list. The number of content IDs 1003 included in the content list information 1000 corresponds to the value of the number of contents 1002.

Figure 11:
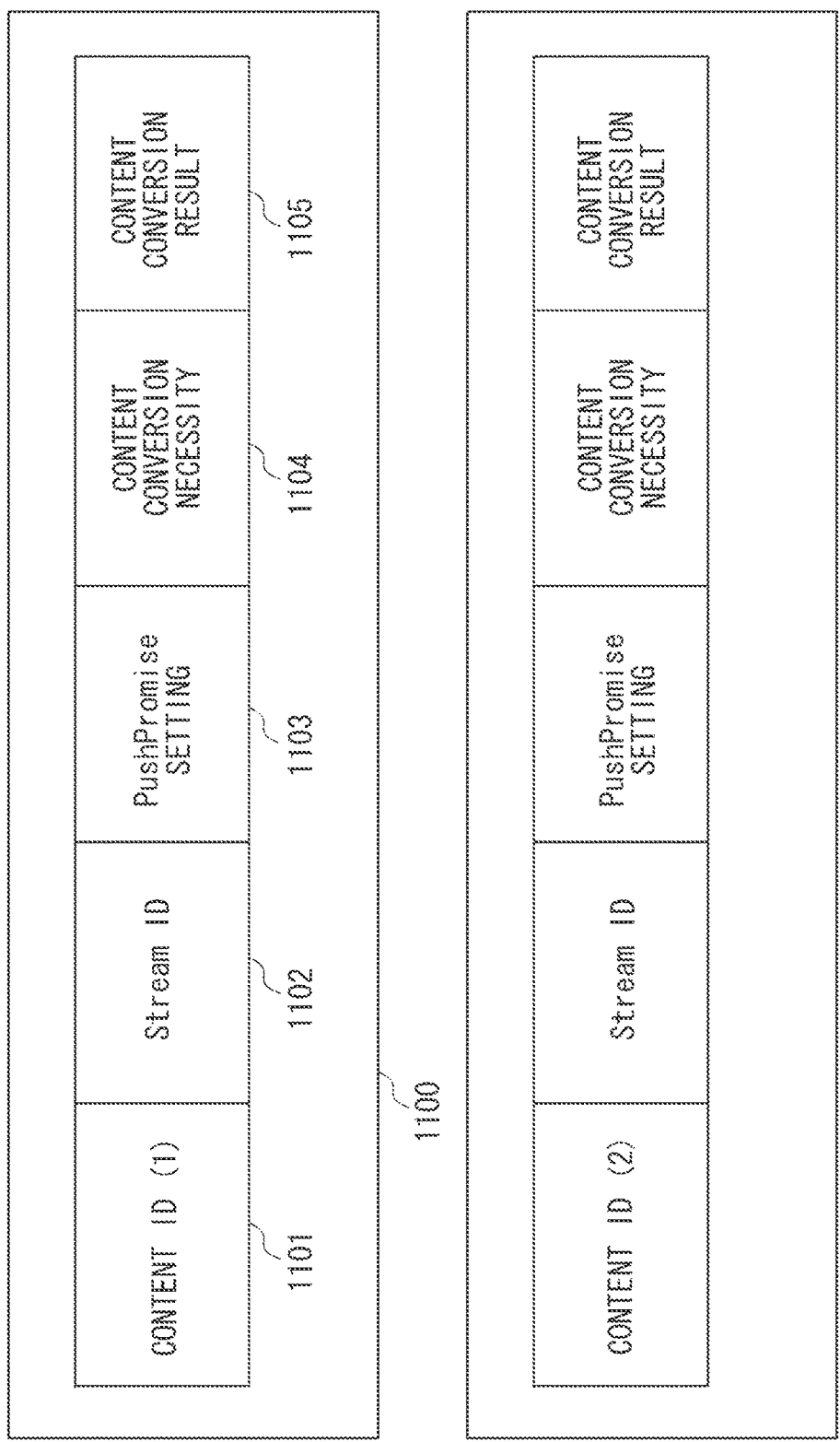
FIG. 11 illustrates an example of a data configuration of content information according to an exemplary embodiment.

FIG. 11 illustrates an example of a data configuration of content information 1100 according to the present exemplary embodiment.

When generating the content list information 1000, the transmission apparatus 20 generates the content information 1100 for each of the contents included in the content list. If the content ID 1003 in the content list information 1000 and a content ID 1101 in the content information 1100 match each other, the content is included in the content list.

The content ID 1101 is identification information of a content. A stream ID 1102 is identification information of a stream to be used during transmission of the content. A PushPromise setting 1103 is a value indicating whether a PushPromise frame for transmitting the content has already been transmitted by the transmission apparatus 20. A PushPromise frame defined in the HTTP/2 includes identification information of a stream to be reserved into the reception apparatus 10 by the transmission apparatus 20. By previously transmitting the PushPromise frame, the transmission apparatus 20 can transmit the content using the reserved stream, without receiving a content acquisition request from the reception apparatus 10. A content conversion necessity 1104 is a value indicating whether a content is required to be converted before being transmitted. A content conversion result 1105 is a value indicating whether a content has not yet been converted or has already been converted, when the content is required to be converted before being transmitted.

<Sequence of Content Transmission>

Figure 4:
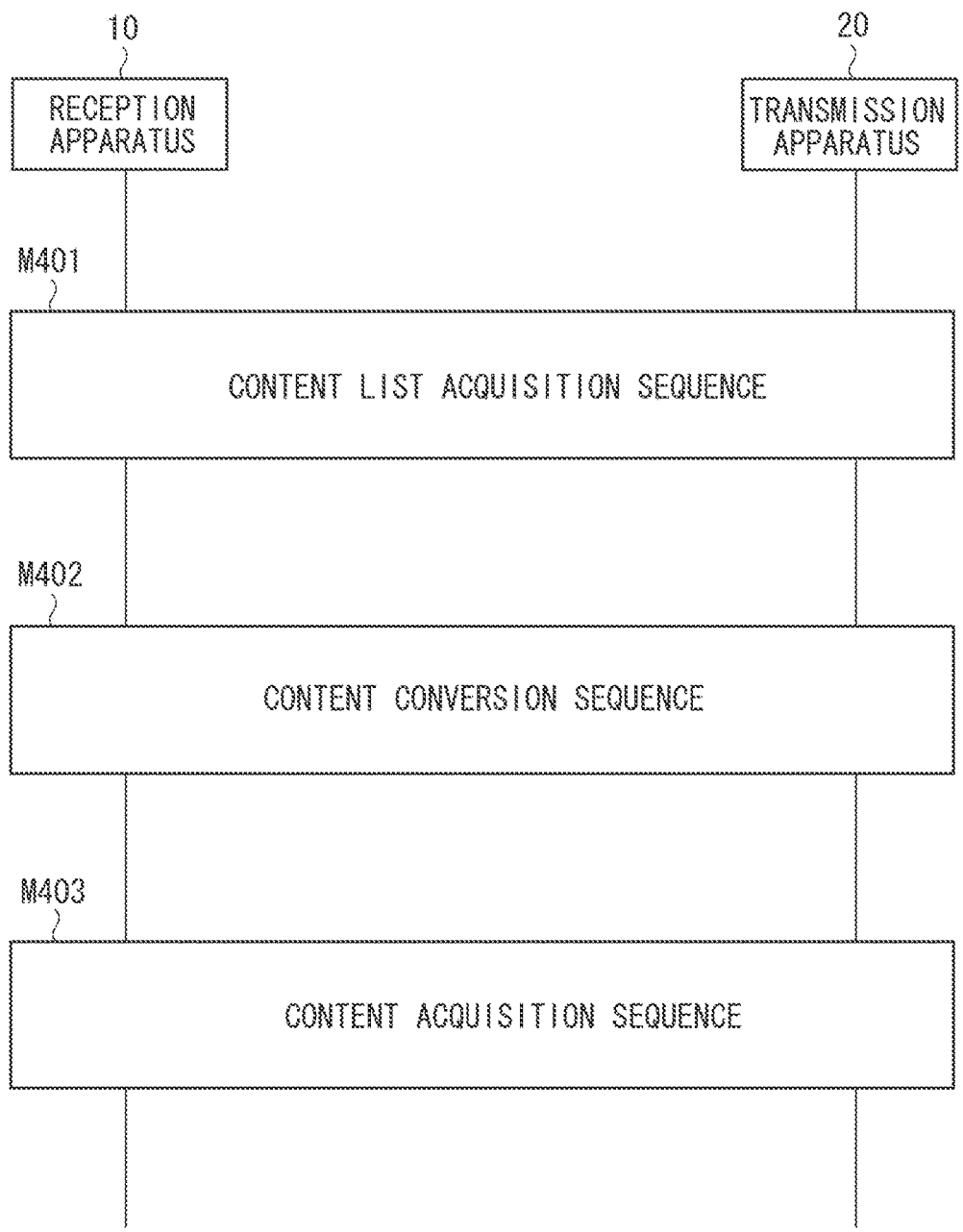
FIG. 4 is a sequence diagram for illustrating a flow of entire content transmission according to an exemplary embodiment.

FIG. 4 is a sequence diagram illustrating a flow of entire content transmission according to the present exemplary embodiment. Processing illustrated in FIG. 4 is started at a timing when a user operation for acquiring a content list is input to the reception apparatus 10 from the transmission apparatus 20. However, the timing when the processing illustrated in FIG. 4 is started is not limited to the above-described timing.

Figure 5:
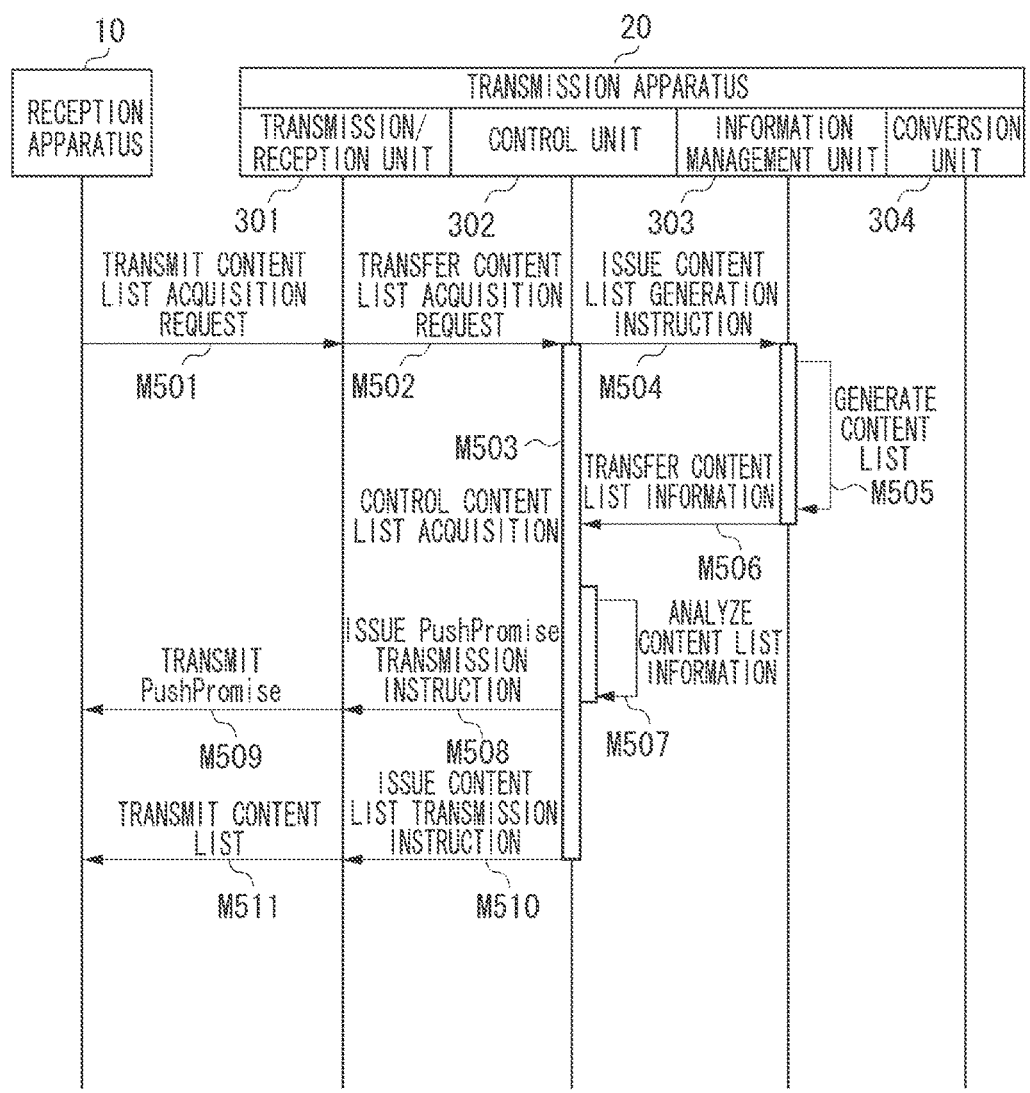
FIG. 5 is a sequence diagram for illustrating details of a content list acquisition sequence according to an exemplary embodiment.
Figure 6:
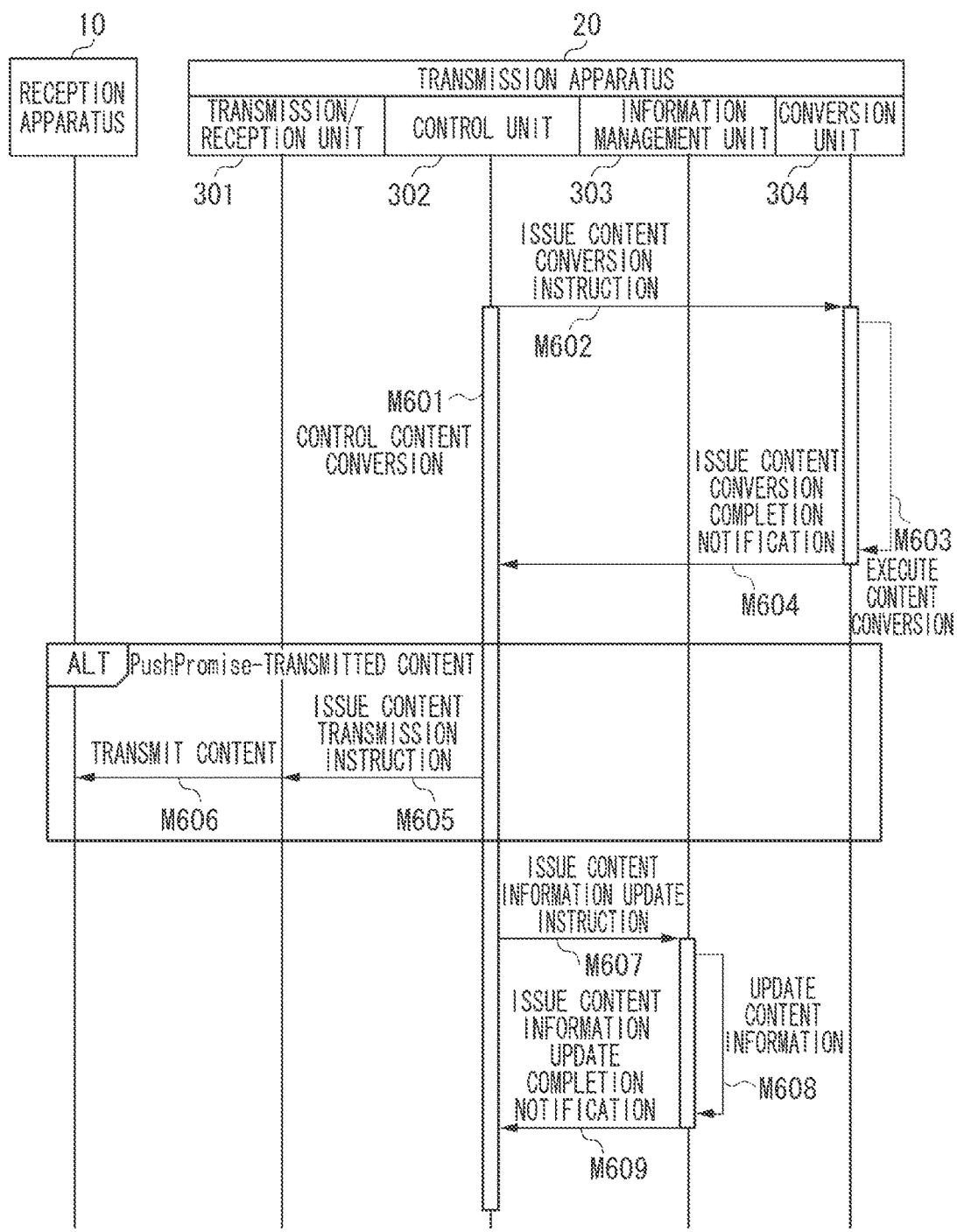
FIG. 6 is a sequence diagram for illustrating details of a content conversion sequence according to an exemplary embodiment.
Figure 7:
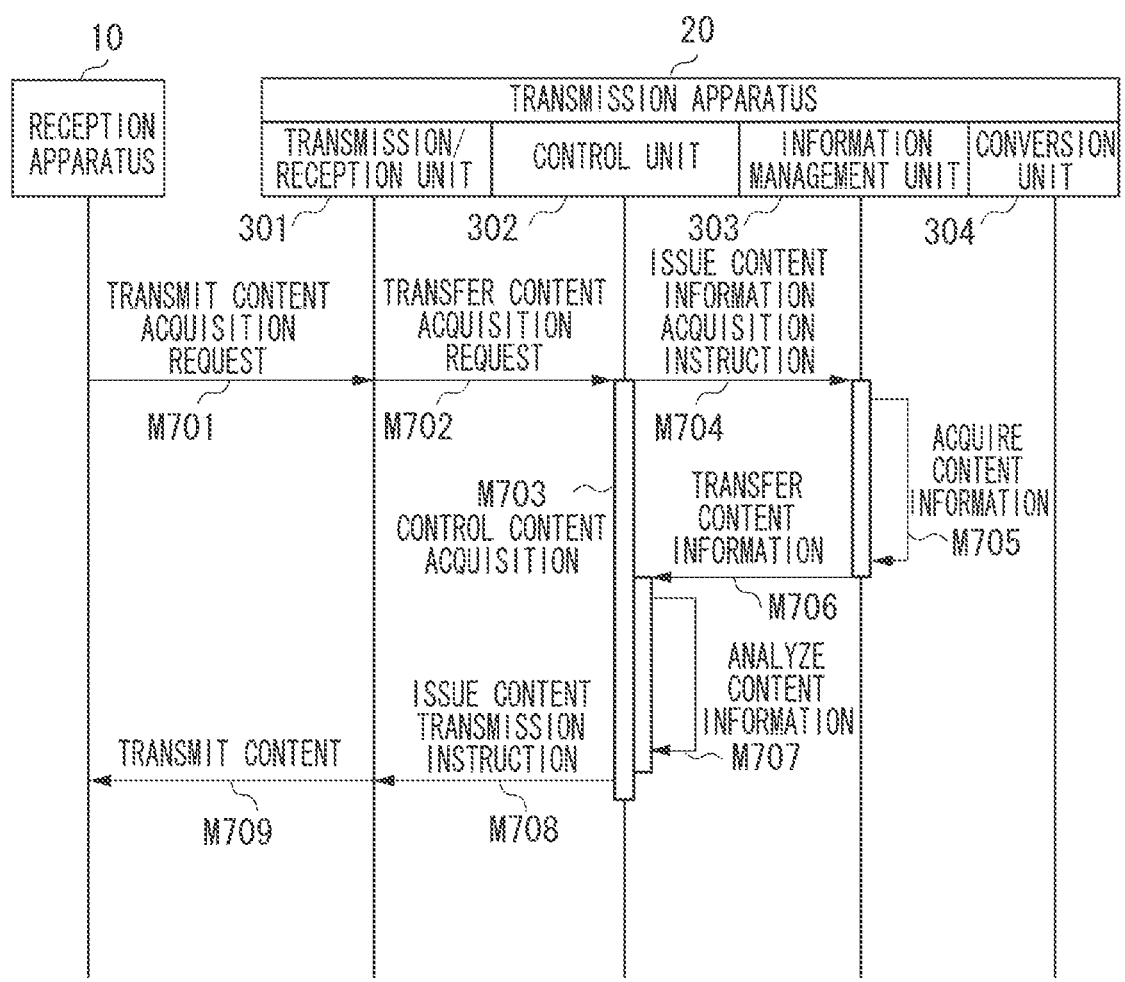
FIG. 7 is a sequence diagram for illustrating details of a content acquisition sequence according to an exemplary embodiment.

In step M401, the reception apparatus 10 transmits a content list acquisition request to the transmission apparatus 20, and acquires a content list. Details of step M401 are illustrated in FIG. 5. In step M402, the transmission apparatus 20 executes content conversion. Details of step M402 are illustrated in FIG. 6. In step M403, the reception apparatus 10 transmits a content acquisition request to the transmission apparatus 20, and acquires a content. Details of step M403 are illustrated in FIG. 7.

FIG. 5 is a sequence diagram for illustrating the details of the content list acquisition sequence illustrated in FIG. 4. Processing illustrated in FIG. 5 is started at a timing when a user operation for acquiring a content list is input to the reception apparatus 10 from the transmission apparatus 20. However, a timing when the processing illustrated in FIG. 5 is started is not limited to the above-described timing.

In step M501, the reception apparatus 10 transmits a content list acquisition request to the transmission/reception unit 301 in the transmission apparatus 20. The content list acquisition request includes information about the type of content. The type of content can be designated by the user of the reception apparatus 10. The type of content includes, for example, information about a type such as a still image, a moving image, and a text, a creation date and time, a creation location, and a creator. The content list acquisition request also includes information about content conversion such as a size and a format of the content that can be handled by the reception apparatus 10.

In step M502, the transmission/reception unit 301 transfers the received content list acquisition request to the control unit 302.

In step M503, the control unit 302 controls processing related to the acquisition of the content list. More specifically, the control unit 302 executes control related to generation of content list information 1000 and content information 1100, analysis of the content list information 1000 and the content information 1100, transmission of a PushPromise frame, and transmission of the content list.

In step M504, the control unit 302 instructs the information management unit 303 to generate the content list.

In step M505, the information management unit 303 generates a list of contents corresponding to the content list acquisition request, and generates the content list information 1000 associated with the list. Identification information of the content list is set in the content list ID 1001, the number of contents included in the content list is set in the number of contents 1002, and identification information of the content included in the content list is set in the content ID 1003. The information management unit 303 also generates the content information 1100 of each of the contents included in the generated content list. The identification information of the content is set in the content ID 1101. Nothing is set in the Stream ID 1102, or a value designated by default may be set therein. A value indicating that a PushPromise frame has not yet been transmitted is set in the PushPromise setting 1103. A value indicating whether the content is required to be converted is set in the content conversion necessity 1104 based on information about content conversion that is included in the content list acquisition request. A value indicating that the content has not yet been converted is set in the content conversion result 1105.

In step M506, the information management unit 303 transfers, to the control unit 302, the generated content list information 1000 and the content information 1100 associated therewith.

In step M507, the control unit 302 analyzes the content list information 1000 and the content information 1100 associated therewith, and determines whether the content list includes a content requiring PushPromise. The content determined to require PushPromise needs to be converted before being transmitted, and cannot be immediately converted. A method for identifying the content that cannot be immediately converted will be described below. If the reception apparatus 10 receives the PushPromise frame, the reception apparatus 10 does not issue an acquisition request for the content designated by the PushPromise frame. Therefore, by the transmission of the PushPromise frame, the transmission apparatus 20 can instruct the reception apparatus 10 not to transmit a content acquisition request for the target content, and can reserve a stream to be used to transmit the target content.

In step M508, the control unit 302 instructs the transmission/reception unit 301 to transmit the PushPromise frame associated with the content that has been determined to require PushPromise in step M507.

In step M509, the transmission/reception unit 301 transmits the PushPromise frame to the reception apparatus 10. When transmitting the PushPromise frame, the transmission/reception unit 301 sets a value indicating that the PushPromise frame has already been transmitted, in the PushPromise setting 1103 associated with the target content. Further, the transmission/reception unit 301 sets, in the Stream ID 1102, identification information of the reserved stream to be notified to the reception apparatus using the PushPromise frame. Alternatively, the transmission/reception unit 301 may transfer to the control unit 302 the identification information of the reserved stream to be notified using the PushPromise frame, and the control unit 302 may control the information management unit 303 to set the Stream ID 1102 of the target content.

In step M510, the control unit 302 instructs the transmission/reception unit 301 to transmit the content list.

In step M511, the transmission/reception unit 301 transmits the content list to the reception apparatus 10.

FIG. 6 is a sequence diagram for illustrating the details of the content conversion sequence illustrated in FIG. 4. Processing illustrated in FIG. 6 is started at a timing when the control unit 302 analyzes the content information 1100 in step M507. However, a timing when the processing illustrated in FIG. 6 is started is not limited to the above-described timing.

In step M601, the control unit 302 controls processing related to content conversion. More specifically, the control unit 302 executes control related to content conversion, transmission of a PushPromise frame-transmitted content, and updating of content information.

In step M602, the control unit 302 instructs the conversion unit 304 to execute content conversion. The instruction includes a content ID and a conversion information of a content to be converted. Examples of the conversion information of the content include conversion of a size and/or a format.

In step M603, the conversion unit 304 accesses the storage unit 305 to execute content conversion according to the content ID and the conversion information that have been designated in step M602. A content newly acquired by the content conversion is stored by the control unit 302 into the storage unit 305.

In step M604, the conversion unit 304 notifies the control unit 302 that the content has already been converted. The control unit 302 checks the PushPromise setting 1103 associated with the content which has already been converted, and if the PushPromise frame has already been transmitted for the content, the control unit 302 executes steps M605 and M606 within an ALT (conditional branching). The reception apparatus 10 can also transmit a cancellation request of PushPromise to the transmission apparatus 20 after receiving the PushPromise frame. If the transmission apparatus 20 receives the cancellation request, the transmission apparatus 20 sets a value indicating that the PushPromise frame has not yet been transmitted, in the PushPromise setting 1103. Thus, the transmission apparatus does not perform processing within the ALT for the content in this case.

In step M605, the control unit 302 instructs the transmission/reception unit 301 to transmit a PushPromise frame-transmitted content that has been converted and stored in the storage unit 305. In this case, a reserved stream identified by the Stream ID 1102 associated with the content is set as a stream to be used for transmission.

In step M606, the transmission/reception unit 301 acquires the content instructed by the control unit 302, from the storage unit 305. The transmission/reception unit 301 then transmits the content to the reception apparatus 10 using the stream that has been set in step M605.

In step M607, the control unit 302 instructs the information management unit 303 to update the content information 1100.

In step M608, the information management unit 303 sets a value indicating that conversion has already been performed, in the content conversion result 1105 associated with the content that has already been converted. If the PushPromise frame has already been transmitted for the content, and the content is being transmitted in steps M605 and M606, the PushPromise setting 1103 is reset to a value indicating that transmission has not yet been performed.

In step M609, the information management unit 303 notifies the control unit 302 that the content information 1100 has been updated.

FIG. 7 is a sequence diagram for illustrating the details of the content acquisition sequence illustrated in FIG. 4. Processing illustrated in FIG. 7 is started at a timing when the reception apparatus 10 receives a content list in step M511. However, a timing when the processing illustrated in FIG. 6 is started is not limited to the above-described timing.

In step M701, the reception apparatus 10 selects a content to be acquired, from among the contents that have not been designated by the PushPromise frame among contents identified by the acquired content list. The reception apparatus 10 then designates a content ID associated with the content, and transmits a content acquisition request to the transmission/reception unit 301 in the transmission apparatus 20. The content for which PushPromise has been canceled after the PushPromise frame has been transmitted once also becomes a target of the content acquisition request. The reception apparatus 10 may automatically select the content to be acquired. Alternatively, the selection may be performed by a method for displaying acquisition candidate contents on a display unit of the reception apparatus 10, and selecting the content by the user.

In step M702, the transmission/reception unit 301 transfers the received content acquisition request to the control unit 302. In addition, the transmission/reception unit 301 sets identification information of a stream used to receive the content acquisition request from the reception apparatus 10, in the Stream ID 1102 associated with the requested content.

In step M703, the control unit 302 controls processing related to content acquisition. More specifically, the control unit 302 executes control related to content information acquisition, content information analysis, and content transmission.

In step M704, the control unit 302 instructs the information management unit 303 to acquire the content information 1100 of the requested content.

In step M705, the information management unit 303 acquires the content information 1100 instructed by the control unit 302.

In step M706, the information management unit 303 transfers the acquired content information 1100 to the control unit 302.

In step M707, the control unit 302 analyzes the acquired content information 1100, and checks the content conversion necessity 1104. If content conversion is not required, the transmission apparatus 20 performs processes in steps M708 and M709. If the content conversion is required, the transmission apparatus 20 checks the content conversion result 1105. If the content conversion has already been executed, the control unit 302 performs processes in steps M708 and M709. If the content conversion is required and has not yet been executed, the control unit 302 performs the processes in steps M708 and M709 after waiting until the content conversion is completed in step M603.

In step M708, the control unit 302 instructs the transmission/reception unit 301 to transmit the content that has been requested in step M701. In this case, a stream identified by the Stream ID 1102 associated with the content is set as a stream to be used for transmission.

In step M709, the transmission/reception unit 301 acquires the content instructed by the control unit 302, from the storage unit 305. The transmission/reception unit 301 then transmits the content to the reception apparatus 10 using the stream set in step M708.

<Processing Flow of Transmission Apparatus>

Figure 8:
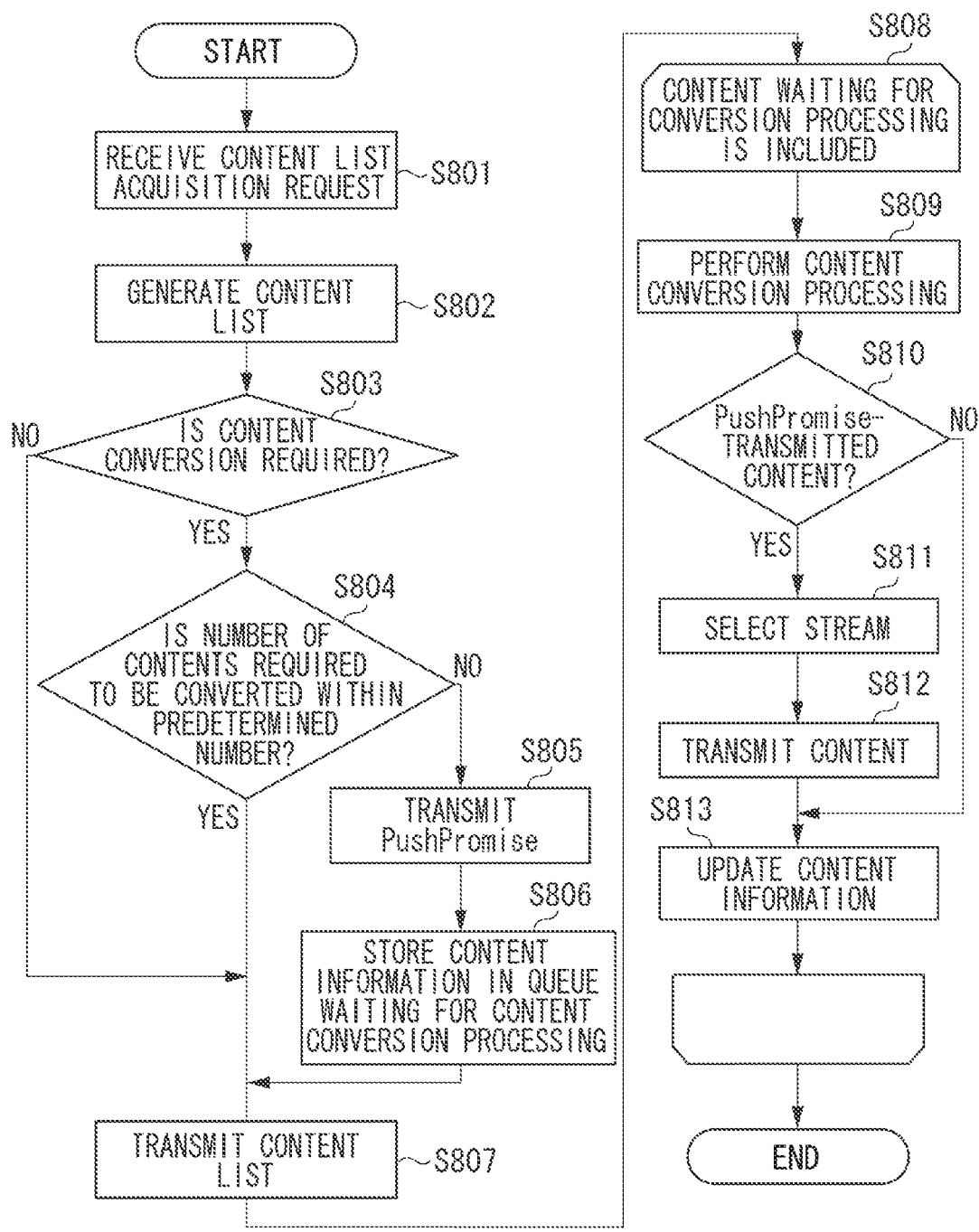
FIG. 8 is a flowchart for illustrating an operation performed when the transmission apparatus receives a content list acquisition request according to an exemplary embodiment.

FIG. 8 is a flowchart for illustrating an operation performed when the transmission apparatus 20 receives a content list acquisition request. The transmission apparatus 20 starts processing illustrated in FIG. 8 at a timing when being set to a content list acquisition request standby state. However, a timing when the processing illustrated in FIG. 8 is started is not limited to the above-described timing. The processing illustrated in FIG. 8 is implemented when the CPU 201 in the transmission apparatus 20 reads and executes a predetermined program. A part or all of the processing illustrated in FIG. 8 may be implemented by dedicated hardware.

In step S801, the transmission/reception unit 301 receives the content list acquisition request from the reception apparatus 10 (step M501), and transfers the received content list acquisition request to the control unit 302 (step M502).

In step 802, the control unit 302 instructs the information management unit 303 to generate a content list (step M504). The information management unit 303 generates the content list information 1000 and the content information 1100 (step M505), and transfers the generated content list information 1000 and content information 1100 to the control unit 302 (step M506).

In step S803, the control unit 302 refers to the content conversion necessity 1104 corresponding to each of one or more content IDs 1003 described in the content list information 1000. Based on the content conversion necessity 1104, the control unit 302 determines whether contents identified by the content list include a content required to be converted. The content required to be converted means an unacquired content (unstored content) that is not stored in the storage unit 305 in a form (a size and/or a format) conforming to the reception apparatus 10. In the present exemplary embodiment, content conversion is required when the storage unit 305 stores only the content in another form. If the contents identified by the content list include the content required to be converted (YES in step S803), the processing proceeds to step S804. On the other hand, if content conversion is not required (NO in step S803), the processing proceeds to step S807.

In step S804, the control unit 302 extracts, from the content list, contents required to be converted, and determines whether the number of contents required to be converted is equal to or less than a predetermined number of contents that can be immediately converted in the conversion unit 304 (step M507). If the number of contents required to be converted is equal to or less than the predetermined number (YES in step S804), the processing proceeds to step S807. On the other hand, if the number of contents required to be converted is more than the predetermined number (NO in step S804), the processing proceeds to step S805. The number of contents that can be immediately converted in the conversion unit 304 is a predetermined number defined according to a processing capability of the transmission apparatus 20, and corresponds to the number of contents that can be concurrently converted in the conversion unit 304, for example.

In step S805, the control unit 302 controls the transmission/reception unit 301 to transmit a PushPromise frame for the content that falls out of the predetermined number of contents that can be immediately converted, among the contents required to be converted (steps M508 and M509). In other words, the control unit 302 does not transmit, among the unacquired contents exceeding in number the predetermined number, respective PushPromise frames corresponding to the predetermined number of unacquired contents, and transmits respective PushPromise frames corresponding to the remaining unacquired contents. By the transmitted PushPromise frame, the transmission apparatus notifies the reception apparatus 10 that the target content is to be transmitted without receiving a content acquisition request from the reception apparatus 10, and the reception apparatus 10 does not transmit an acquisition request for the content any more. In short, the control unit 302 can instruct the reception apparatus 10 not to transmit a content acquisition request for the target content by transmitting the PushPromise frame to the reception apparatus 10. The PushPromise frame includes identification information of a stream set in the Stream ID 1102 associated with the target content. Accordingly, by transmitting the PushPromise frame, the control unit 302 can designate a stream for transmitting the target content, and notify the reception apparatus 10 of the identification information of the stream.

In step S806, the control unit 302 stores the content information 1100 of a content for which PushPromise is to be executed, into a queue for managing a content that waits to be converted.

In step S807, the control unit 302 instructs the transmission/reception unit 301 to transmit the content list (step M510), and the transmission/reception unit 301 transmits the content list to the reception apparatus 10 (step M511). In the present exemplary embodiment, the transmission of the PushPromise frame by the control unit 302 in step S805 is performed before the transmission of the content list by the transmission/reception unit 301 in step S807. Thus, the reception apparatus 10 can identify the content for which the content acquisition request is not to be transmitted, at the time point when it has received the content list.

In step S808, if the content required to be converted is included in the content list, the control unit 302 starts loop processing related to content conversion. If the content required to be converted is not included in the content list, the processing illustrated in FIG. 8 ends.

In step S809, the control unit 302 instructs the conversion unit 304 to execute content conversion (step M602). The conversion unit 304 accesses the storage unit 305, and performs content conversion processing based on information about content conversion that is included in the content list acquisition request (step M603). In the content conversion processing, the conversion unit 304 converts at least any of a size and a format of the content required to be converted, which is stored by the storage unit 305, to acquire a content in a form corresponding to the reception apparatus 10. However, processing performed in step S809 is not limited to the content conversion as in the present exemplary embodiment. For example, if the storage unit 305 does not store a target content, the processing performed in step S809 may include processing for the transmission apparatus 20 to acquire an unacquired content in the form corresponding to the reception apparatus 10, from another apparatus via the transmission/reception unit 301.

In step S810, the control unit 302 determines whether the content having already been converted is a PushPromise frame-transmitted content, by referring to the PushPromise setting 1103 (step M604). If the PushPromise frame for the content having already been converted has already been transmitted (YES in step S810), the processing proceeds to step S811. On the other hand, if the PushPromise frame has not yet been transmitted (NO in step S810), the processing proceeds to step SS813.

In step S811, the control unit 302 selects a stream, which has been reserved using the PushPromise frame and is indicated in the Stream ID 1102, as a stream for transmitting the content that has already been converted.

In step S812, the control unit 302 instructs the transmission/reception unit 301 to transmit the PushPromise frame-transmitted content, which has already been converted (step M605). The transmission/reception unit 301 acquires the target content from the storage unit 305, and transmits the acquired target content to the reception apparatus 10 using a stream for which the control unit 302 has notified the reception apparatus 10 of the identification information using the PushPromise frame (step M606).

In step S813, the control unit 302 requests the information management unit 303 to update the content information 1100 associated with the content that has already been converted (step M607). The information management unit 303 updates the content information 1100 (step M608), and notifies the control unit 302 that the content information 1100 has been updated (step M609).

The control unit 302 removes the content information 1100, which has been updated, from a content conversion processing queue. The processes in steps S809 to S813 described above are repeatedly executed until there no longer exists in the queue content information 1100 of a content required to be converted.

Figure 9:
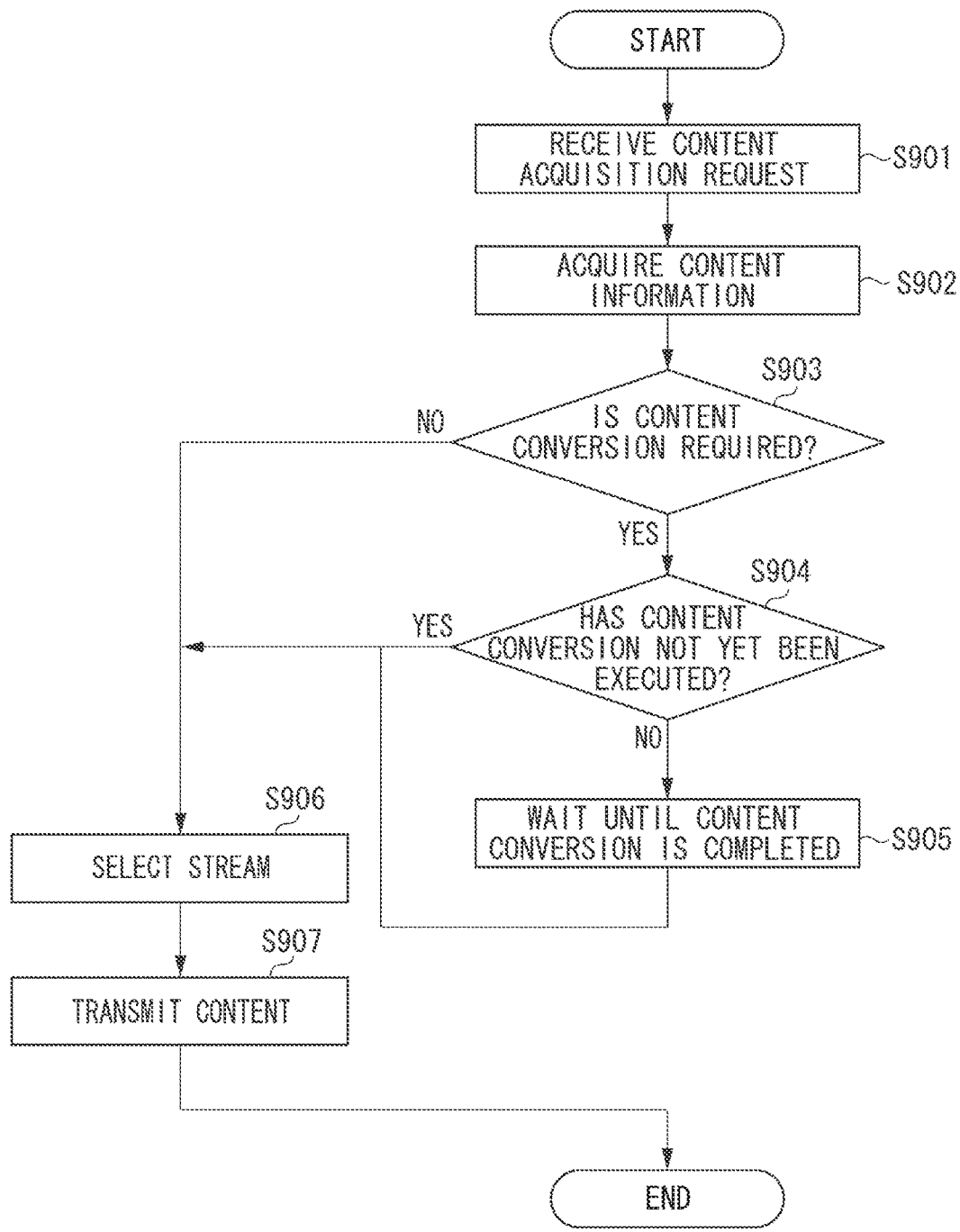
FIG. 9 is a flowchart for illustrating an operation performed when the transmission apparatus receives a content acquisition request according to an exemplary embodiment.

FIG. 9 is a flowchart for illustrating an operation of the transmission apparatus 20 that has received a content acquisition request. The transmission apparatus 20 starts processing illustrated in FIG. 9 at a timing when being set to a content acquisition request standby state. However, a timing when the processing illustrated in FIG. 9 is started is not limited to the above-described timing. The processing illustrated in FIG. 9 is implemented when the CPU 201 in the transmission apparatus 20 reads and executes a predetermined program. A part or all of the processing illustrated in FIG. 9 may be implemented by dedicated hardware.

In step S901, the transmission/reception unit 301 receives the content acquisition request from the reception apparatus 10 (step M701), and transfers the received content acquisition request to the control unit 302 (step M702). A content ID of a content to be acquired is set in the content acquisition request received from the reception apparatus 10.

In step S902, the control unit 302 instructs the information management unit 303 to acquire the content information 1100 (step M704). The information management unit 303 acquires the content information 1100 of the designated content ID (step M705), and transfers the acquired content information 1100 to the control unit 302 (step M706).

In step S903, the control unit 302 refers to the content conversion necessity 1104 in the acquired content information 1100, and determines whether content conversion is required. If the content conversion is required (YES in step S903), the processing proceeds to step S904. If the content conversion is not required (NO in step S903), the processing proceeds to step S906.

In step S904, the control unit 302 refers to the content conversion result 1105 in the acquired content information 1100, and determines whether the content conversion has not yet been executed. If the content conversion has not yet been executed (NO in step S904), the processing proceeds to step S905. On the other hand, if the content conversion has already been performed (YES in step S904), the processing proceeds to step S906 (step M707).

In step S905, the control unit 302 waits until it is notified by the conversion unit 304 that the content conversion has been completed.

In step S906, the control unit 302 selects a stream, which has been used for receiving the content acquisition request and is indicated in the Stream ID 1102, as a stream for transmitting the content.

In step S907, the control unit 302 instructs the transmission/reception unit 301 to transmit the content (step M708). The transmission/reception unit 301 acquires the content stored in the storage unit 305, and transmits the acquired content to the reception apparatus 10 (step M709).

As illustrated in FIG. 9, the transmission apparatus 20 transmits, via the transmission/reception unit 301, the content in response to the content acquisition request from the reception apparatus 10, which has received the content list in step S807.

<Sequence Example of Transmission of a Plurality of Contents>

Figure 12:
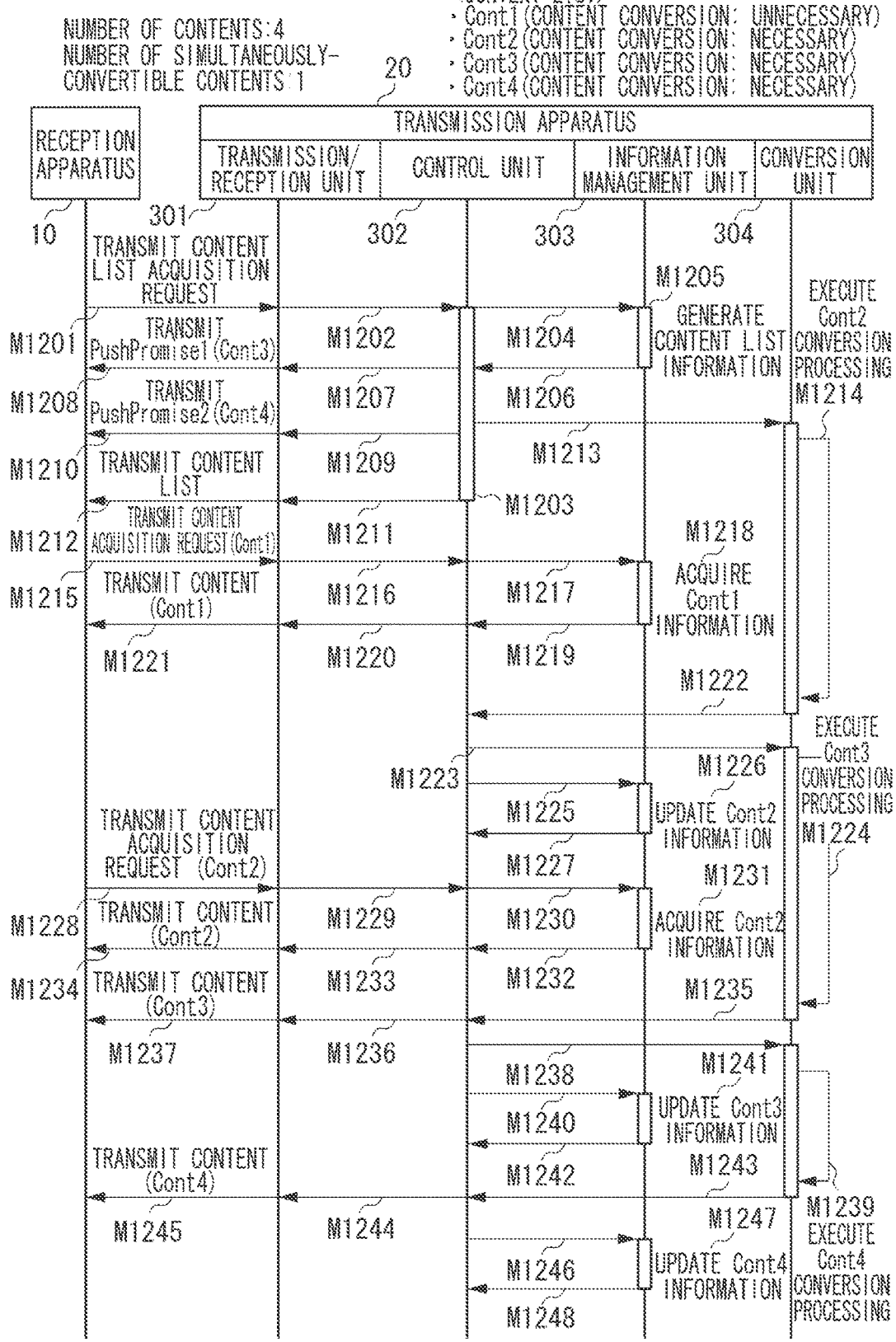
FIG. 12 is a sequence diagram illustrating an example of entire processing during transmission of a plurality of contents according to an exemplary embodiment.

FIG. 12 is a sequence diagram illustrating an example of entire processing during transmission of a plurality of contents according to the present exemplary embodiment. In FIG. 12, a content list transmitted by the transmission apparatus 20 in response to a request from the reception apparatus 10 includes four contents. Cont1 is a content not required to be converted, and Cont2, Cont3, and Cont4 are contents required to be converted. The conversion unit 304 has a processing capability of concurrently converting only one content.

In step M1201, the reception apparatus 10 transmits a content list acquisition request to the transmission/reception unit 301 in the transmission apparatus 20. In step M1202, the transmission/reception unit 301 transfers the content list acquisition request to the control unit 302. In step M1203, the control unit 302 controls processing related to content list acquisition. More specifically, the control unit 302 performs control related to steps M1204, M1206, M1207, M1209, and M1211. In step M1204, the control unit 302 instructs the information management unit 303 to generate a content list. In step M1205, the information management unit 303 generates the content list information 1000. At this time, respective pieces of content information 1100 of the contents Cont1, Cont2, Cont3, and Cont4 are also generated. In step M1206, the information management unit 303 transfers the content list information 1000 and the content information 1100 to the control unit 302.

The control unit 302 analyzes the content list information 1000 and the content information 1100. The control unit 302 determines, among the contents Cont2, Cont3, and Cont4 that are required to be converted, the contents Cont3 and Cont4, excluding the content Cont2 to be first converted, require PushPromise.

In steps M1207 and M1209, the control unit 302 instructs the transmission/reception unit 301 to transmit respective PushPromise frames for the contents Cont3 and Cont4. In steps M1208 and M1210, the transmission/reception unit 301 transmits the PushPromise frames for the contents Cont3 and Cont4, respectively, to the reception apparatus 10. In step M1211, the control unit 302 instructs the transmission/reception unit 301 to transmit the content list. In step M1212, the transmission/reception unit 301 transmits the content list to the reception apparatus 10.

In step M1213, the control unit 302 instructs the conversion unit 304 to convert the content Cont2. In step M1214, the conversion unit 304 executes processing for converting the content Cont2.

In step M1215, the reception apparatus 10 refers to the content list received in step M1212, and the PushPromise frames received in steps M1208 and M1210, and selects the content Cont1 not required to be converted, as a content to be acquired. The reception apparatus 10 then transmits a content acquisition request for the content Cont1 to the transmission/reception unit 301 in the transmission apparatus 20. In step M1216, the transmission/reception unit 301 transfers the content acquisition request for the content Cont1 to the control unit 302. In step M1217, the control unit 302 instructs the information management unit 303 to acquire the content information 1100 associated with the content Cont1. In step M1218, the information management unit 303 acquires the content information 1100 associated with the content Cont1. In step M1219, the information management unit 303 transfers the content information 1100 associated with the content Cont1 to the control unit 302. In step M1220, the control unit 302 instructs the transmission/reception unit 301 to transmit the content Cont1. In step M1221, the transmission/reception unit 301 transmits the content Cont1 to the reception apparatus 10.

In step M1222, the conversion unit 304 notifies the control unit 302 that the content Cont2 has already been converted. In step M1223, the control unit 302 instructs the conversion unit 304 to convert the content Cont3. In step M1224, the conversion unit 304 converts the content Cont3.

In step M1225, the control unit 302 instructs the information management unit 303 to update the content information 1100 associated with the content Cont2 that has already been converted. In step M1226, the information management unit 303 updates the content information 1100 associated with the content Cont2. In step M1227, the information management unit 303 notifies the control unit 302 that the content information 1100 associated with the content Cont2 has been updated.

In step M1228, the reception apparatus 10 selects the content Cont2, which is required to be converted and for which PushPromise has not been executed, as a content to be acquired. The reception apparatus 10 then transmits the content acquisition request for the content Cont2 to the transmission/reception unit 301 in the transmission apparatus 20. In step M1229, the transmission/reception unit 301 transfers the content acquisition request for the content Cont2 to the control unit 302. In step M1230, the control unit 302 instructs the information management unit 303 to acquire the content information 1100 associated with the content Cont2. In step M1231, the information management unit 303 acquires the content information 1100 associated with the content Cont2. In step M1232, the information management unit 303 transfers the content information 1100 associated with the content Cont2 to the control unit 302. In step M1233, the control unit 302 instructs the transmission/reception unit 301 to transmit the content Cont2. In step M1234, the transmission/reception unit 301 transmits the content Cont2 to the reception apparatus 10.

In step M1235, the conversion unit 304 notifies the control unit 302 that the content Cont3 has already been converted. In step M1236, the control unit 302 confirms that the content Cont3, which has already been converted, is a content reserved by PushPromise, and requests the transmission/reception unit 301 to transmit the content Cont3. In step M1237, the transmission/reception unit 301 transmits the content Cont3 to the reception apparatus 10.

In step M1238, the control unit 302 instructs the conversion unit 304 to convert the content Cont4. In step M1239, the conversion unit 304 converts the content Cont4.

In step M1240, the control unit 302 instructs the information management unit 303 to update the content information 1100 associated with the content Cont3 that has already been converted. In step M1241, the information management unit 303 updates the content information 1100 associated with the content Cont3. In step M1242, the information management unit 303 notifies the control unit 302 that the content information 1100 associated with the content Cont3 has been updated.

In step M1243, the conversion unit 304 notifies the control unit 302 that the content Cont4 has already been converted. In step M1244, the control unit 302 confirms that the content Cont4, which has already been converted, is a content reserved by PushPromise, and instructs the transmission/reception unit 301 to transmit the content Cont4. In step M1245, the transmission/reception unit 301 transmits the content Cont4 to the reception apparatus 10.

In step M1246, the control unit 302 instructs the information management unit 303 to update the content information 1100 associated with the content Cont4 that has already been converted. In step M1247, the information management unit 303 updates the content information 1100 associated with the content Cont4. In step M1248, the information management unit 303 notifies the control unit 302 that the content information 1100 associated with the content Cont4 has already been updated.

As described above, the transmission apparatus 20 according to the present exemplary embodiment generates the content list in response to the request from the reception apparatus 10. The PushPromise frame is transmitted for the content, which is required to be converted and cannot be immediately converted, among the contents included in the content list. The reception apparatus 10 does not transmit the content acquisition request for the content for which the PushPromise frame has been received. This can reduce a useless content acquisition request transmitted for the content that requires time to be converted. The content for which PushPromise has been executed is Push-transmitted from the transmission apparatus 20 to the reception apparatus 10 immediately after it has been converted. Thus, low-delay and efficient content transmission can be performed.

In the present exemplary embodiment, the content for which PushPromise has been executed is Push-transmitted from the transmission apparatus 20 to the reception apparatus 10 immediately after it has been converted. However, a method for transmitting the content is not limited to Push transmission. For example, the content can also be transmitted in the following manner. When the content designated by the PushPromise frame has already been converted, the control unit 302 controls the transmission/reception unit 301 to issue a request permission notification for permitting a content acquisition request for the content, to the reception apparatus 10. The reception apparatus 10 then transmits to transmission apparatus 20 the content acquisition request for the content corresponding to the request permission notification, and the transmission apparatus 20 transmits the content to the reception apparatus 10 in response to the transmitted content acquisition request. According to this method, the possibility that the reception apparatus receives an unnecessary content from the transmission apparatus 20 can be reduced. A timing of the request permission notification is not limited to a timing when content conversion is completed. The request permission notification is only required to be issued at a timing according to conversion processing (acquisition processing) for the content. For example, the request permission notification may be issued at a timing when conversion is started or a predetermined period of time before completion of conversion.

In the above-described embodiment, the PushPromise frame is transmitted for the content that is required to be converted before being transmitted and cannot be immediately converted. However, the content for which the PushPromise frame is to be transmitted is not limited to this. The PushPromise frame is transmitted to at least one of the unacquired contents that are not stored in a form corresponding to the reception apparatus 10. For example, if a period of time required to convert the content is longer than an interval at which a request from the reception apparatus 10 is retransmitted, PushPromise can be executed even for the content that can be immediately converted.

While the transmission apparatus 20 generates and transmits the content list in response to the content list acquisition request from the reception apparatus 10 in the above-described exemplary embodiment, an apparatus that generates the content list is not limited to the transmission apparatus 20. For example, an apparatus different from the transmission apparatus 20 may generate a content list, and transmit the generated content list to the transmission apparatus 20 and the reception apparatus 10. Then, based on the received content list, the transmission apparatus 20 and the reception apparatus 10 can exchange a content acquisition request, a PushPromise frame, and the like.

In the above-described exemplary embodiment, the description has been mainly given of an example of the case where the transmission apparatus 20 transmits the content list and the PushPromise frame to the reception apparatus 10 to thereby control the content acquisition request from the reception apparatus 10. The present invention is, however, not limited to this example. For example, the content acquisition request can be controlled in the following manner. The transmission apparatus 20 transmits the content information 1100 together with the content list information 1000 to the reception apparatus 10. Among a plurality of contents identified by the content list information 1000, the reception apparatus 10 distinguishably displays contents required to be converted and contents not required to be converted, to make the user select a content to be acquired. The reception apparatus 10 then transmits the content acquisition request for the content selected by the user, and acquires the content from the transmission apparatus 20.

According to an exemplary embodiment of the present invention, the possibility that the reception apparatus retransmits the content acquisition request can be reduced, so that the content can be efficiently transmitted from the transmission apparatus to the reception apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005927, filed Jan. 15, 2015, which is hereby incorporated by reference herein in its entirety.

What is claimed is:

1. An apparatus comprising:
   at least one hardware processor; and
   a memory which stores instructions executable by the at least one hardware processor to cause the apparatus to perform at least:
   determining whether contents identified by a content list to be transmitted to a reception apparatus include one or more unstored contents that have not been stored in a storage unit;
   issuing, in a case where the contents identified by the content list include one or more unstored contents, a notification to the reception apparatus for restraining the reception apparatus from transmitting a content request for at least one unstored content to be stored and transmittable afterward;
   acquiring and storing the at least one unstored content specified by the notification into the storage unit after issuing the notification for restraining the reception apparatus from transmitting the content request for the at least one unstored content to be stored and transmittable afterward; and
   transmitting, in response to a content request from the reception apparatus that has received the content list, a content stored in the storage unit to the reception apparatus.

2. The apparatus according to claim 1,
   wherein the notification includes identification information of a stream for transmitting the content specified by the notification from the transmission apparatus to the reception apparatus, and
   wherein in the transmitting a content stored after issuing the notification is transmitted to the reception apparatus by using the stream corresponding to the identification information.

3. The apparatus according to claim 1, wherein the instructions further causes the apparatus to perform:
   issuing a request permission notification for permitting a content request for the content specified by the notification, to the reception apparatus according to content acquisition processing for acquiring and storing the content into the storage unit, and
   wherein in the transmitting, a content stored after issuing the notification is transmitted to the reception apparatus in response to a content request from the reception apparatus that has received the request permission notification.

4. The apparatus according to claim 1, wherein in the acquiring and storing after issuing the notification, a content acquired by converting at least any of the size and the format of a stored content gets to be stored into the storage unit.

5. The apparatus according to claim 1, wherein in the acquiring and storing after issuing the notification, a content acquired from an external apparatus gets to be stored into the storage unit.

6. The apparatus according to claim 1, wherein the notification indicates that the at least one unstored content specified by the notification is to be transmitted by the transmission apparatus without a content request from the reception apparatus.

7. The apparatus according to claim 1, wherein the notification is issued by transmission of a PushPromise frame defined in an HTTP/2.

8. The apparatus according to claim 1, wherein the instructions further cause the apparatus to perform:
   selecting, according to a number of unstored contents included in the contents identified by the content list, at least one content to be specified by the notification from among the unstored contents, and wherein
   in the issuing, the notification for restraining the reception apparatus from transmitting the at least one content selected in the selecting is issued to the reception apparatus in the case where it is determined that the contents identified by the content list include one or more unstored contents.

9. The apparatus according to claim 1,
   wherein in a case where it is determined that a number of the unstored contents included in the contents identified by the content list exceeds a predetermined number defined according to a processing capability of the transmission apparatus, the notification for restraining the reception apparatus from transmitting a content request for the at least one unstored content other than the predetermined number of unstored contents is issued in the issuing.

10. The apparatus according to claim 9, wherein the predetermined number corresponds to a number of contents that are concurrently acquirable by the transmission apparatus.

11. The apparatus according to claim 1, wherein in the issuing, the notification is issued to the reception apparatus before the content list is transmitted to the reception apparatus.

12. The apparatus according to claim 11, wherein the instructions further cause the apparatus to perform:
   transmitting the content list of contents to the reception apparatus before storing the at least one unstored content into the storage unit.

13. A method comprising:
   determining whether contents identified by the content list of contents that is to be transmitted from a transmission apparatus to a reception apparatus include one or more unstored contents that have not been stored in a storage unit;
   issuing a notification from the transmission apparatus to the reception apparatus in a case where the contents identified by the content list include one or more unstored contents, wherein the notification specifies at least one unstored content that is not yet transmittable;
   transmitting the content list from the transmission apparatus to the reception apparatus;
   transmitting, from the reception apparatus to the transmission apparatus, a content request for a content that is included in the content list and not specified by the notification;

acquiring and storing, by the transmission apparatus, the at least one unstored content specified by the notification into the storage unit after issuing the notification; and transmitting, in response to the content request transmitted from the reception apparatus that has received the content list a content stored in the storage unit from the transmission apparatus to the reception apparatus.

14. The method according to claim 13, further comprising:

transmitting, from the transmission apparatus to the reception apparatus, a content stored into the storage unit after issuing the notification, without a content request for the content.

15. A method performed by a transmission apparatus, the method comprising:

determining whether contents identified by a content list to be transmitted to a reception apparatus include one or more unstored contents that have not been stored in a storage unit;

issuing, in a case where the contents identified by the content list include one or more unstored contents, a notification to the reception apparatus for restraining the reception apparatus from transmitting a content request for at least one unstored content to be stored and transmittable afterward;

acquiring and storing the at least one unstored content specified by the notification, into the storage unit after issuing the notification for restraining the reception apparatus from transmitting the content request for the at least one unstored content to be stored and transmittable afterward; and transmitting, in response to a content request from the reception apparatus that has received the content list, a content stored in the storage unit to the reception apparatus.

16. The method according to claim 15, wherein the notification includes identification information of a stream for transmitting the content specified by the notification from the transmission apparatus to the reception apparatus, and wherein in the transmitting a content stored after issuing the notification is transmitted to the reception apparatus by using the stream corresponding to the identification information.

17. A computer readable storage medium storing a computer-executable program of instructions for causing a computer to perform a method comprising:

determining whether contents identified by a content list to be transmitted to a reception apparatus include one or more unstored contents that have not been stored in a storage unit;

issuing, in a case where the contents identified by the content list include one or more unstored contents, a notification to the reception apparatus for restraining the reception apparatus from transmitting a content request for at least one unstored content to be stored and transmittable afterward;

acquiring and storing the at least one unstored content specified by the notification, into the storage unit after issuing the notification for restraining the reception apparatus from transmitting a content request for the at least one unstored content to be stored and transmittable afterward; and transmitting, in response to the content request from the reception apparatus that has received the content list, a content stored in the storage unit to the reception apparatus.

18. The storage medium according to claim 17, wherein the notification includes identification information of a stream for transmitting the content specified by the notification from the transmission apparatus to the reception apparatus, and wherein in the transmitting a content stored after issuing the notification is transmitted the reception apparatus by using the stream corresponding to the identification information.

19. A system including a transmission apparatus and a reception apparatus, the transmission apparatus comprising:

a storage unit configured to store a content;

a determination unit configured to determine whether contents identified by a content list is to be transmitted to the reception apparatus include one or more unstored contents that have not been stored in the storage unit;

a notification unit configured to issue a notification, in a case where the contents identified by the content list include one or more unstored contents, a notification to the reception apparatus for restraining the reception apparatus from transmitting a content request for at least one unstored content to be stored and transmittable afterward;

a control unit configured to acquire and store the at least one unstored content specified by the notification into the storage unit, after the notification unit issues the notification for restraining the reception apparatus from transmitting a content request for the at least one unstored content to be stored and transmittable afterward; and a transmission unit configured to transmit, in response to the content request from the reception apparatus that has received the content list, a content stored in the storage unit to the reception apparatus.

20. The system according to claim 19, wherein the notification includes identification information of a stream for transmitting the content specified by the notification from the transmission apparatus to the reception apparatus, and wherein the transmission unit transmits a content stored after issuing the notification to the reception apparatus by using the stream corresponding to the identification information.

21. The system according to claim 19, wherein in a case where the determination unit determines that a number of the unstored contents included in the contents identified by the content list exceeds a predetermined number defined according to a processing capability of the transmission apparatus, the notification unit issues the notification for restraining the reception apparatus from transmitting a content request for the at least one unstored content other than the predetermined number of unstored contents.

22. The system according to claim 19, wherein the notification unit issues the notification to the reception apparatus before the content list is transmitted to the reception apparatus.

* * * * *